United States Patent
Xu et al.

(10) Patent No.: US 10,181,028 B2
(45) Date of Patent: Jan. 15, 2019

(54) METHOD AND APPARATUS TO SANDBOX RUN-TIME ANDROID APPLICATIONS WITH LIGHTWEIGHT CONTAINER

(71) Applicant: Samsung Electronics Co., Ltd., Suwon-si, Gyeonggi-do (KR)

(72) Inventors: Jinlin Xu, San Jose, CA (US); Haiqing Jiang, San Jose, CA (US); Dingbang Xu, San Jose, CA (US); Renuka Srinivasan, Milpitas, CA (US); Xinwen Zhang, San Ramon, CA (US); Peng Ning, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 486 days.

(21) Appl. No.: 14/555,950

(22) Filed: Nov. 28, 2014

(65) Prior Publication Data

US 2015/0242622 A1 Aug. 27, 2015

Related U.S. Application Data

(60) Provisional application No. 61/942,902, filed on Feb. 21, 2014.

(51) Int. Cl.
*G06F 21/53* (2013.01)
*G06F 9/445* (2018.01)

(52) U.S. Cl.
CPC ............. *G06F 21/53* (2013.01); *G06F 9/445* (2013.01); *G06F 9/44505* (2013.01)

(58) Field of Classification Search
CPC ....... G06F 21/53; G06F 9/445; G06F 9/44505
See application file for complete search history.

(56) References Cited

U.S. PATENT DOCUMENTS

| | | | |
|---|---|---|---|
| 2006/0036570 A1* | 2/2006 | Schaefer | G06F 9/44505 |
| 2008/0109871 A1 | 5/2008 | Jacobs | |
| 2009/0007009 A1* | 1/2009 | Luneau | G06F 3/0482 715/808 |
| 2009/0307105 A1 | 12/2009 | Lemay et al. | |

(Continued)

FOREIGN PATENT DOCUMENTS

| | | |
|---|---|---|
| CN | 102089744 A | 6/2011 |
| EP | 2 533 168 A1 | 12/2012 |
| WO | 2013/055570 A1 | 4/2013 |

OTHER PUBLICATIONS

Smalley et al.; "Security Enhanced(SE) Android: Bringing Flexible MAC to Android"; National Security Agency; http://selinuxproject.org/page/SEAndroid; Feb. 25, 2013; pp. 1-18; San Diego, CA, USA.

(Continued)

*Primary Examiner* — Robert B Leung
*Assistant Examiner* — Thomas Ho
(74) *Attorney, Agent, or Firm* — Jefferson IP Law, LLP

(57) ABSTRACT

An apparatus and method for generating an application container are provided. The method includes selecting a target application from among a plurality of applications included in an electronic device, acquiring a policy file corresponding to the target application, determining whether the policy file includes a category of the target application, and executing the application container which includes the target application.

20 Claims, 4 Drawing Sheets

(56) References Cited

U.S. PATENT DOCUMENTS

| | | | |
|---|---|---|---|
| 2011/0029977 A1* | 2/2011 | Ramanathaiah | G06F 9/5038 |
| | | | 718/102 |
| 2012/0117504 A1 | 5/2012 | Lemay et al. | |
| 2013/0130651 A1* | 5/2013 | Deasy | C09J 7/041 |
| | | | 455/411 |
| 2013/0139220 A1 | 5/2013 | Bhanoo et al. | |
| 2014/0040978 A1 | 2/2014 | Barton et al. | |
| 2014/0337528 A1* | 11/2014 | Barton | H04L 63/10 |
| | | | 709/225 |
| 2016/0196432 A1* | 7/2016 | Main | G06F 8/61 |
| | | | 726/1 |
| 2016/0301680 A1* | 10/2016 | Main | H04W 12/08 |

OTHER PUBLICATIONS

Bugiel et al.; "Towards a Framework for Android Security Modules: Extending SE Android Type Enforcement to Android Middleware"; System Security Lab | CASED; Feb. 20, 2013; pp. 1-35; Technische Universitat Darmstadt, Germany.

* cited by examiner

METHOD AND APPARATUS TO SANDBOX RUN-TIME ANDROID APPLICATIONS WITH LIGHTWEIGHT CONTAINER

CROSS-REFERENCE TO RELATED APPLICATION(S)

This application claims the benefit under 35 U.S.C. § 119(e) of a U.S. Provisional application filed on Feb. 21, 2014 in the U.S. Patent and Trademark Office and assigned Ser. No. 61/942,902, the entire disclosure of which is hereby incorporated by reference.

TECHNICAL FIELD

The present disclosure relates to an apparatus and method to sandbox run-time Android applications with a lightweight container. More particularly, the present disclosure relates to an apparatus and method for grouping at least one Android application into a sandbox at run-time.

BACKGROUND

Mobile terminals are developed to provide wireless communication between users. As technology has advanced, mobile terminals now provide many additional features beyond simple telephone conversations. For example, mobile terminals now provide additional functions, such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and other similar functions.

Additionally, mobile terminals may execute applications, which may provide the above noted functions and/or provide other functions and/or operations on the mobile terminals. For example, the applications may include a music playback application, a video playback application, a photo gallery application, game applications, social networking applications, internet browsing applications, file management applications, cloud service applications, and any other similar and/or suitable applications, functions, and/or operations. However, a user of an Operating System (OS) of a mobile terminal, such as an Android OS and/or any other similar and/or suitable OS, may group applications to be included in a sandbox so that when executed, or in other words, at run-time, the applications and respective application data and code execution for the applications in the sandbox are isolated from the rest of the mobile terminal so that the applications in the sandbox are only shared with other applications included in the sandbox. However, the sandbox may not provide adequate isolation between the applications included in the sandbox and the applications excluded from the sandbox.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for generating an application container.

In accordance with an aspect of the present disclosure, a method for generating an application container is provided. The method includes selecting a target application from among a plurality of applications included in an electronic device, acquiring a policy file corresponding to the target application, determining whether the policy file includes a category of the target application, and executing the application container which includes the target application.

In accordance with another aspect of the present disclosure, an electronic device for generating an application container is provided. The apparatus includes a display unit configured to display at least one application included in the electronic device, and a processor configured to selecting a target application from among the at least one application included in the electronic device, to acquire a policy file corresponding to the target application, to determining whether the policy file includes a category of the target application, and to execute the application container which includes the target application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAIL DESCRIPTION

Figure 1:
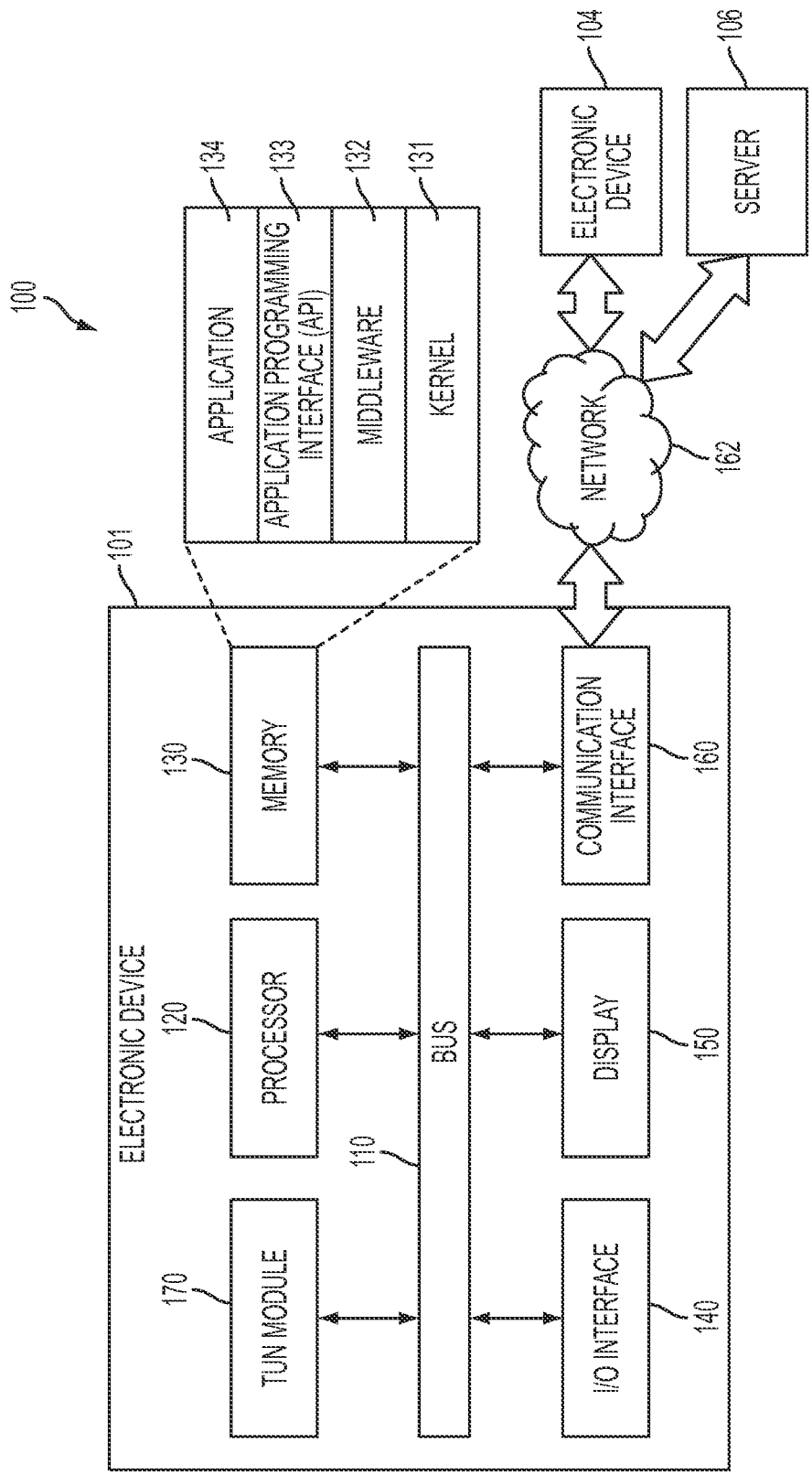
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed descriptions with reference to the accompanying drawings are provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an electronic-book (e-book) reader, a desktop PC, a laptop PC, a netbook PC, a Personal Digital Assistant (PDA), a Portable Multimedia Player (PMP), a Motion Picture Experts Group (MPEG) Audio Layer 3 (MP3) player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., a Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method to sandbox run-time Android applications with a lightweight container.

For example, there may be a case in which a user of a mobile terminal needs to group at least one application, which may also be referred to as an Android application, to be in a sandbox at run-time so that the application data and code execution corresponding to the at least one application included in the sandbox are isolated from at least one of applications, application data, and code execution corresponding to applications and/or elements of the electronic device that are not included in the sandbox.

In further detail, a user may need to group at least one office application, such as a word processing application and a spreadsheet application, at run time. The resources, such as data, a socket, etc., created by the grouped applications may only be shared by the grouped applications such that the resources are not shared with applications excluded from the grouped applications. The components of the grouped applications may not be launched by any application that is not included in the grouped applications. For example, the user may group at least one banking application, such as an application for monitoring and maintaining a bank account corresponding to the user, and an application corresponding to a credit account, so that no other application access the resources used by the group of the at least one banking application, so that any component level communication between the applications included in the group of the at least one banking application and the applications excluded from the group of the at least one banking application is blocked, and so that the group is considered to be a sandbox. In other words, the applications included in the group of the at least one banking application are blocked form communicating, at a component level, with the applications excluded from the group of the at least one banking application.

However, related-art methods of sandboxing a group of applications, such that they are included in a sandbox, may fail to provide a secure environment and may fail to provide strong isolation between applications included in the sandbox and applications excluded from the sandbox. Additionally, a related-art version of Security Enhancements (SE) for Android (SEAndroid) provides a kernel and Middleware Mandatory Access-Control (MMAC) mechanism to group several Android applications into a sandbox group, which may also be referred to as a sandbox, so that the applications may not be started by applications outside of the sandbox group and vice versa. Data isolation and protection is supported by a SEAndroid policy (SEPolicy). However, the sandbox, according to the related-art version of SEAndroid, should be pre-configured at a building time and/or at a SE Linux (SELinux) policy update time, and the related-art version of SEAndroid does not support grouping apps to form a sandbox at run-time. Additionally, although, according to the related-art version of SEAndroid, grouped applications may run in, or in other words, be executed in, a virtual machine. However, running multiple virtual machines on a mobile phone may be difficult due to performance issues. Also, it may be difficult to launch virtual machines in an on-demand manner during run-time.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a sandbox module 170, and/or the like. However, the present disclosure is not limited thereto, and the sandbox module 170 may be included in other elements of the electronic device 101, such as the processor 120, and/or any other similar and/or suitable element in which the sandbox module 170 may be included.

The bus 110 may be a hardware device including circuitry, may connect the foregoing components, and may allow communication between the foregoing components. For example, the bus 110 may connect components of the electronic device 101 to transmit and/or receive control messages and/or other information to be communicated between the connected components.

The processor 120 may, for example, receive instructions from other components, e.g., the memory 130, the I/O interface 140, the display 150, the communication interface 160, the sandbox module 170, and/or the like, interpret the received instructions, and execute computation and/or data processing according to the interpreted instructions.

The memory 130 may, for example, store instructions and/or data that are received from, and/or generated by, other components, e.g., the memory 130, the I/O interface 140, the display 150, the communication interface 160, the sandbox module 170, and/or the like. For example, the memory 130 may include programming modules, such as a kernel 131, a middleware 132, an Application Programming Interface (API) 133, an application 134, and/or the like. Each of the foregoing programming modules may include a combination of at least two of software, firmware, and hardware.

The kernel 131 may control and/or manage system resources, e.g., the bus 110, the processor 120, the memory 130, and/or the like, that may be used in executing operations or functions implemented in other programming modules, such as the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium, and/or any suitable hardware and/or software element, through which the kernel 131 may communicate with the API 133, the application 134, and/or the like to send and receive data. The middleware 132 may perform control, e.g., may perform scheduling, load balancing, and/or the like, of work requests generated by and/or corresponding to the application 134. For example, the middleware 132 may control work requests by the application 134 by assigning priorities for using system resources (e.g., the bus 110, the processor 120, the memory 130, and/or the like) of the electronic device 101 to the application 134.

The API 133 may be an interface that controls functions that the application 134 may provide at the kernel 131, the middleware 132, and/or the like. For example, the API 133 may include at least an interface and/or a function, e.g., a command, for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application, e.g., an exercise amount application, a blood sugar level measuring application, and/or the like, an environmental information application, e.g., an application that may provide atmospheric pressure, humidity, temperature information, and/or the like, an instant messaging application, a call application, an internet browsing application, a gaming application, a media playback application, an image/video capture application, a file management application, and/or the like. Additionally and/or alternatively, the application 134 may be an application that is associated with information exchange between the electronic device 101 and an external electronic device, e.g., electronic device 104. As an example, the application 134 that is associated with the information exchange may include a notification relay application that may provide the external electronic device with a certain type of information, a device management application that may manage the external electronic device, and/or the like.

As an example, the notification relay application may include a functionality that provides a notification generated by other applications included in the electronic device 101, e.g., the SMS/MMS application, the email application, the health care application, the environmental information application, the instant messaging application, the call application, the internet browsing application, the gaming application, the media playback application, the image/video capture application, the file management application, and/or the like, to an external electronic device, e.g., the electronic device 104. Additionally, the notification relay application may provide, for example, a receive notification from an external electronic device, e.g., the electronic device 104, and may provide the notification to a user.

As an example, the device management application may manage enabling or disabling of functions associated with at least a portion of an external electronic device, e.g., the external electronic device itself, and/or at least one component of the external electronic device, in communication with the electronic device 101, may control brightness and/or resolution of a display of the external electronic device 101, may control an application operated at, or a service, e.g., a voice call service, a messaging service, and/or the like, provided by, the external electronic device 101, and/or the like.

According to various embodiments of the present disclosure, as an example, the application 134 may include at least one application that is determined according to a property, e.g., a type of an electronic device, and/or the like, of the external electronic device, e.g., the electronic device 104. For example, if the external electronic device is a Motion Picture Experts Group (MPEG) Audio-Layer 3 (MP3) player, the application 134 may include at least one application related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device, e.g., the electronic device 104, a server 106, and/or the like.

The I/O interface 140 may, for example, receive at least one of an instruction and/or data from a user. The I/O interface 140 may send the instruction and/or the data, via the bus 110, to the processor 120, the memory 130, the communication interface 160, the sandbox module 170, and/or the like. For example, the I/O interface 140 may provide data associated with a user input, such as a user input received via a touch screen, to the processor 120. The I/O interface 140 may, for example, output instructions and/or data received via the bus 110 from the processor 120, the memory 130, the communication interface 160, the sandbox module 170, and/or the like, via an I/O device, e.g., a speaker (not shown), a display (not shown), and/or the like. For example, the I/O interface 140 may output voice data, e.g., voice data processed using the processor 120, via the speaker.

The display 150 may display various types of information, e.g., multimedia, text data, and/or the like, to the user. As an example, the display 150 may display a Graphical User Interface (GUI) with which a user may interact with the electronic device 101.

The communication interface 160 may provide communication between the electronic device 101 and one or more external electronic devices, e.g., the electronic device 104, the server 106, and/or the like. For example, the communication interface 160 may communicate with the external electronic device by establishing a connection with a network 162 using wireless and/or wired communication. As an example, the communication interface 160 may communicate using wireless communications which may be at least one of, Wi-Fi, Bluetooth, Near Field Communication (NFC), Global Positioning System (GPS), cellular communication e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like, Infrared Data Association (IrDA) technology, and/or the like. Additionally and/or alternatively, for example, the communication interface 160 may communicate with wired communication, which may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol, e.g., a transport layer protocol, a data link layer protocol, a physical layer protocol, and/or the like, for communicating between electronic device 101 and an external electronic device may be supported by, for example, at least one of the application 134, the API 133, the middleware 132, the kernel 131, the communication interface 160, and/or the like.

Figure 2:
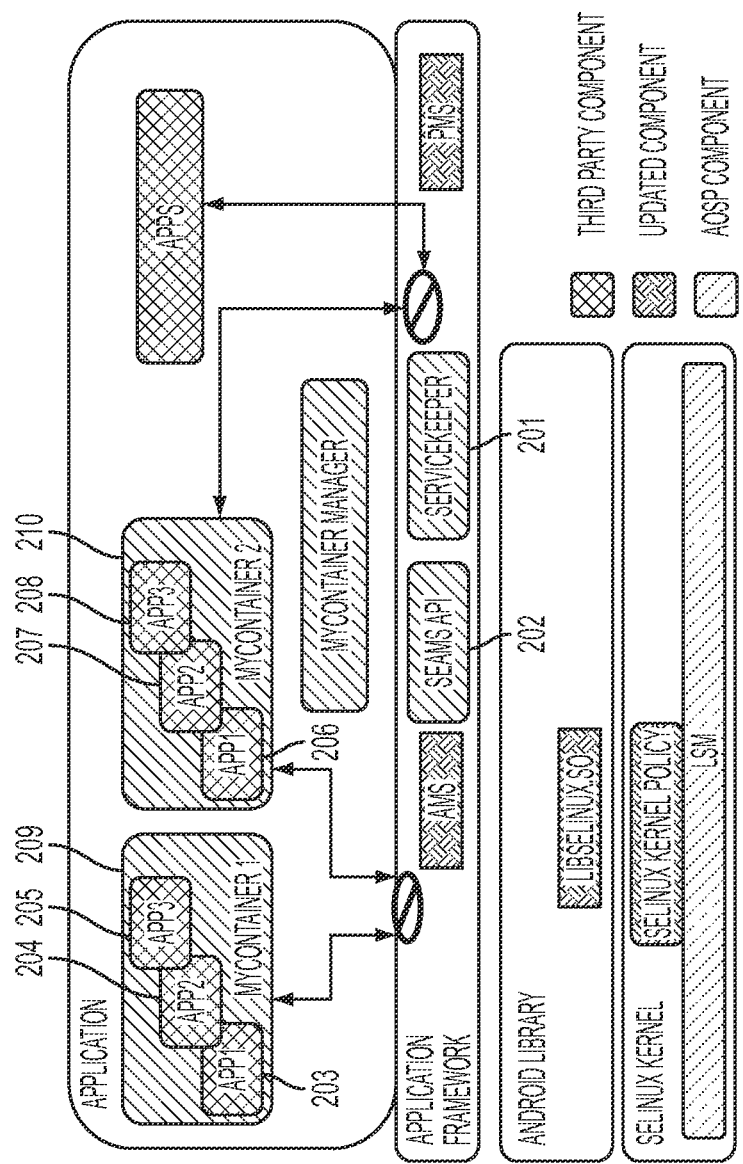
FIG. 2 illustrates an architecture for execution of a PerAppContainer according to various embodiments of the present disclosure.

The sandbox module 170 may, for example, process at least a part of information received from other components, e.g., the processor 120, the memory 130, the I/O interface 140, the communication interface 160, and/or the like, and provide may various information, services, and/or the like to the user in various manners. For example, the sandbox module 170 may control, via the processor 120 or independently, at least some of the functions of the electronic device 101 to communicate and/or connect to another electronic device, e.g., the electronic device 104, the server 106, and/or the like. FIG. 2 will provide additional information regarding the sandbox module 170, which may provide a PerAppContainer, which may also be referred to as a MyContainer, in order to contain at least one application to be executed at run-time in an isolated container with an Application Program Interface (API).

FIG. 2 illustrates an architecture for execution of a PerAppContainer according to various embodiments of the present disclosure.

Referring to FIG. 2, the sandbox module 170, and/or any other similar and/or suitable element, unit, and/or hardware device and/or hardware unit, of the electronic device 101, such as the processor 120, may provide the PerAppContainer. The PerAppContainer allows for at least one application, such as an Android application, to be run, or in other words to be executed, in an isolated container environment with an API call in order to provide a sandbox to the at least one application at run-time, and to separate application data and code execution corresponding to the at least one application between the at least one application and other applications not included in the sandbox.

For example, in a case of Samsung Knox 2.0, which is provides security services, the PerAppContainer may include a Multi-Level Security/Multi-Category Security (MLS/MCS) policy for SEAndroid. Particularly, a target application is assigned to a dedicated category, such that a SEAndroid security policy guarantees that the application runs in, or is executed in, an isolated environment, wherein untrusted applications may not access the target application's data and other respective objects, and the interactions between the target application and other untrusted applications is blocked.

According to the related art, which includes a Mobile Device Management (MDM) container, an Android application may be either re-packaged, e.g., with redexing and/or application wrapping technologies, or is developed with a dedicated Software Development Kit (SDK). Accordingly, in the MDM container of the related art, a downloaded application, or in other words any arbitrary application, in a container may not be run and/or executed.

In contrast, according to an embodiment of the present disclosure, the PerAppContainer provides a method to run a downloaded application or any other similar and/or suitable application in a lightweight container using SEAndroid Manager Service (SEAMS).

The PerAppContainer, according to an embodiment of the present disclosure, may be generated and/or terminated by calling a SEAMS API, e.g., a call generated by an MDM client and/or an Android application, such as MyContainerManager. With a User Interface (UI) provided by the MyContainerManager, a user may select at least one of applications installed on the electronic device 101 in order to form a MyContainer at run-time. Additionally, an MDM client may perform operations of the MyContainerManager without needing user input.

Android applications in a MyContainer may not be launched, i.e. run and/or executed, by any applications that are located outside of the MyContainer, or in other words, any applications that are not included in the MyContainer, which is enforced by a Mandatory Access Control (MAC) mechanism implemented in Activity Manager Service. Accordingly, resources created by any application included in the MyContainer may not be accessed by any application that is excluded from, or in other words, any application that is outside of, the MyContainer because such applications are blocked by a SELinux Multiple Categories Security (MCS) mechanism implemented at a Linux kernel level.

Specifically, with an authorized call, which may be an API call made by a ServiceKeeper 201 authorized MDM client or agent, the SEAMS may create a new category for a target application, may update a policy file in the electronic device 101 to specify that the application will be assigned to this new category, and may re-label the data file objects of the target application according to the new category.

After the SEAMS has created the new category for the target application and completed the above noted steps, then, when the application is restarted, a Package Manager Service (PMS) of Android queries the updated policy file. This ensures that Zygote, which includes core libraries common to applications included in the electronic device 101, will assign the new category as part of a security context of the application processes. With a default security policy providing both kernel level isolation and middleware level isolation, the application processes are isolated both in the kernel level and the middleware level. Further details of how the target application is isolated with policy enforcement in middleware and kernel level may be found in the policy-based container IDF.

As shown in FIG. 2, the architecture for execution of the PerAppContainer shows a high level view of running the PerAppContainer. In a case where an MDM client is authorized by the ServiceKeeper 201, the MDM client may call a SEAMS API 202 to assign a unique category to any one of a plurality of applications, including applications App1 203 to App6 208, which may be running and/or executed in isolated containers, such as a MyContainer1 209, which includes applications App1 203, App2 204, and App3 205, and a MyContainer2 210, which includes applications App4 206, App5 207, and App6 208. Additionally, multiple PerAppContainers, or in other words, more than one instance of a PerAppContainer, may be running concurrently on a device, such as the electronic device 101, and each instance of a PerAppContainer may be for different application types, such as a PerAppContainer for a single instance of a banking application, and/or a PerAppContainer for games, and/or any other PerAppContainer for any suitable and/or similar instance and/or group of applications. However, an application may only be assigned to a single PerAppContainer at any one time.

Figure 3:
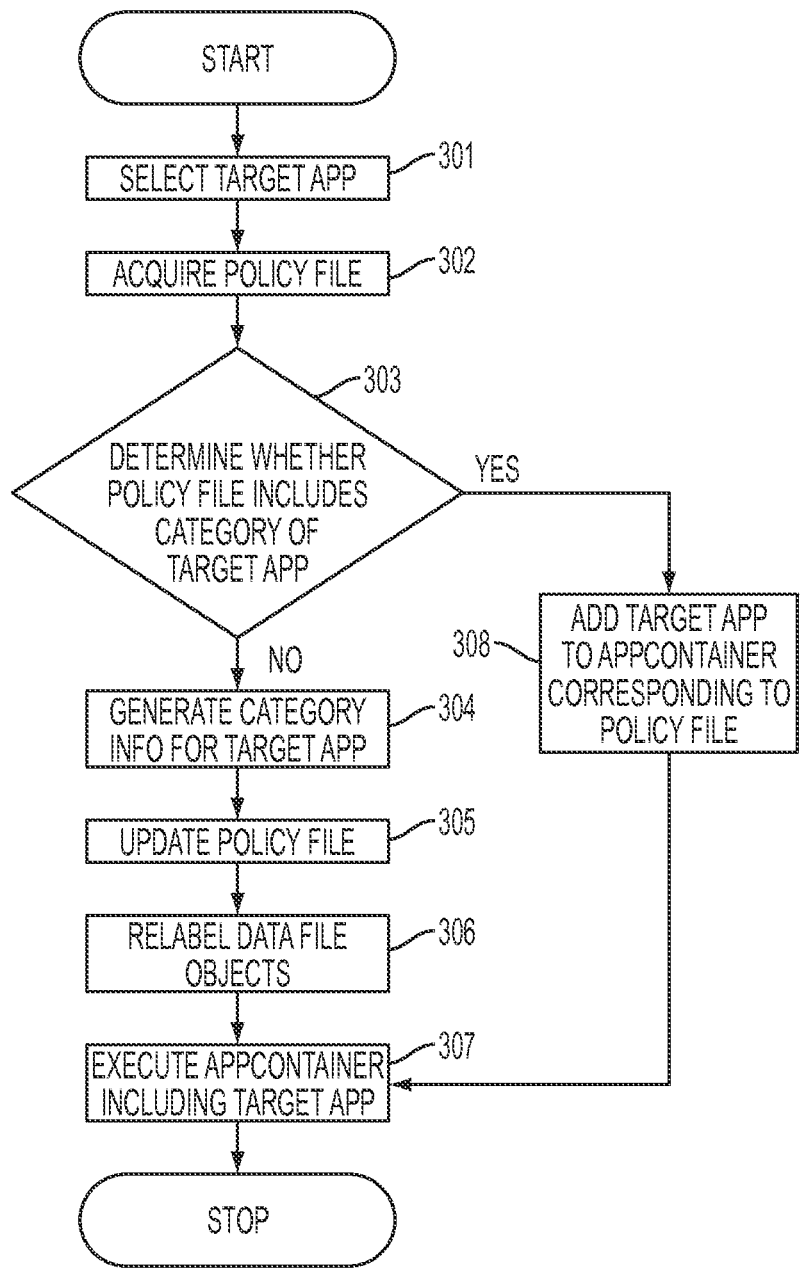
FIG. 3 illustrates a method for execution of a PerApp-Container according to various embodiments of the present disclosure.

FIG. 3 illustrates a method for execution of a PerAppContainer according to various embodiments of the present disclosure.

Referring to FIG. 3, a user may select a target application, which may also be referred to as a target app, at operation 301. For example, the electronic device 101 may display at least one application via the display 150, and a user of the electronic device 101 may select at least one target application, e.g., at least one target app, from among the at least one application displayed on the display 150. However, various embodiments of the present disclosure are not limited thereto, and any suitable application that may be executed by the electronic device 101 may be selected as a target application.

Next, in operation 302, the electronic device 101 may acquire a policy file corresponding to the target application selected by the user. The policy file may include information corresponding to the target application selected by the user, such as an application name, a digital certificate, a related category, and any other similar and/or suitable information corresponding to the target application selected by the user. The policy file may be revised and/or changed based on a changing environment of a device, such as the electronic device 101, and/or according to needs of a user. The policy file may be stored on and/or acquired from the memory 130 and/or from any other similar and/or suitable source that stores the policy file.

At operation 303, the electronic device 101 determines whether the policy file includes information indicating a category of the target app. For example, the policy file may include information indicating that the category of the target app is "health care application" if the target app is related to operations of a mobile medical device, and as another example, the target app may be included in a "Music Playback" category if the target app is related to operations of a MP3 player. However, the present disclosure is not limited thereto, and the category of the target app may be any similar and/or suitable type of category of applications executable on the electronic device 101.

If the electronic device 101 determines, at operation 303, that the policy file does not include information indicating the category of the target app, the electronic device 101 may generate category information for the target app at operation 304. For example, the electronic device 101 may display at least one category on the display 150 such that the user of the electronic device 101 selects the category of the target app from among the displayed at least one category. Alternatively and/or additionally, the user of the electronic device 101 may input the category of the target app via the I/O Interface 140, via the display 150, and/or via any similar and/or suitable method of inputting the category of the target app.

Next, in operation 305, the electronic device 101 may update the policy file with the category of the target app. For example, the electronic device 101 may update the policy file to specify that the target app will be assigned to a new category inputted by the user. Next, at operation 306, the electronic device 101 may re-label data file objects of the target app according to the new category.

Returning to operation 303, if the electronic device determines that the policy file does include information indicating the category of the target app, then the electronic device 101 proceed to operation 308 in order to add the target app to an Appcontainer corresponding to the policy file according to the category of the target app. Next, at operation 307, the electronic device 101 executes the Appcontainer including the target app.

Figure 4:
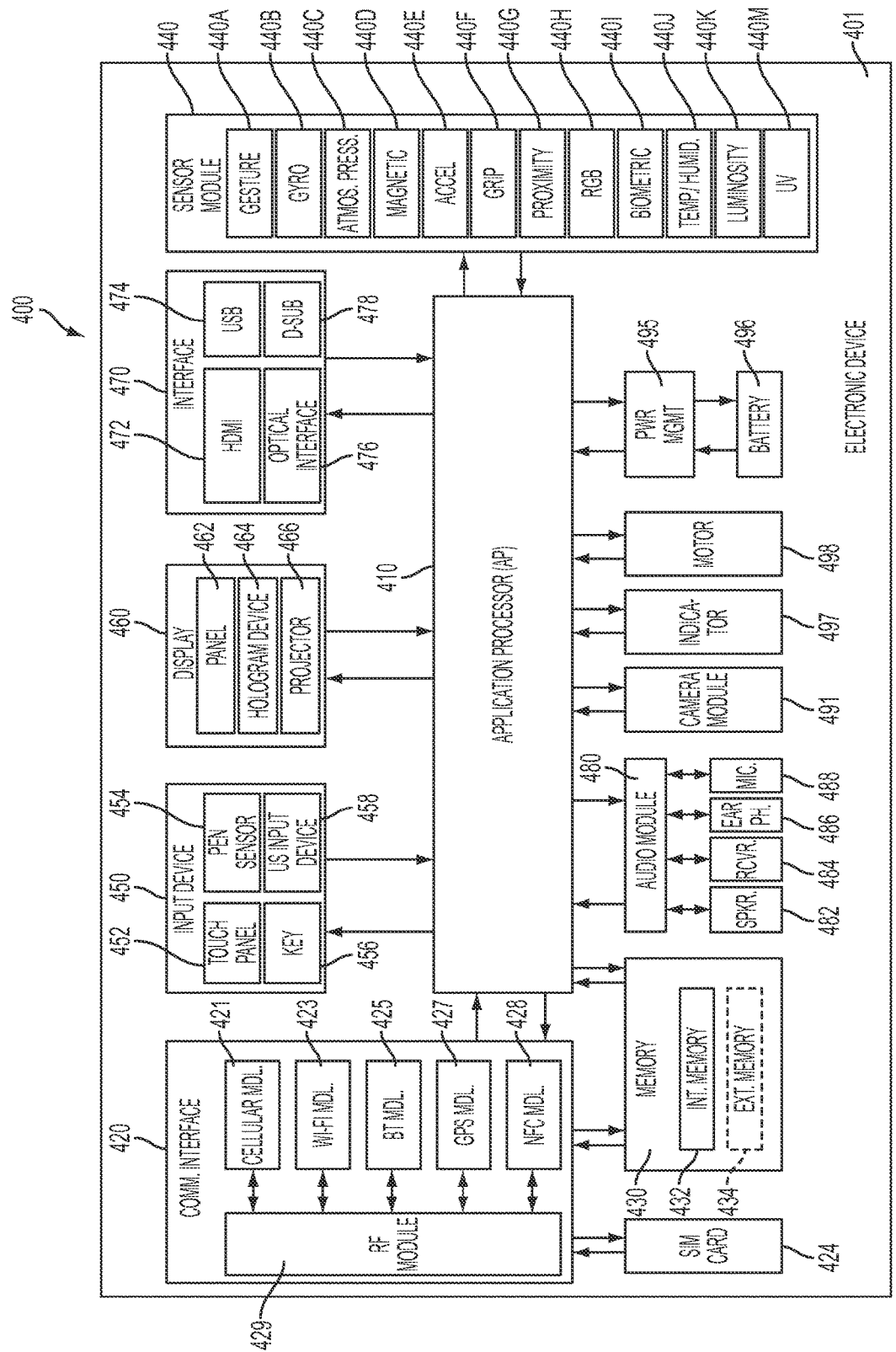
FIG. 4 illustrates a block diagram of hardware according to various embodiments of the present disclosure.

FIG. 4 illustrates a block diagram of hardware according to various embodiments of the present disclosure.

Referring to FIG. 4, an electronic device 401 may be, for example, a part of, or an entirety of, the electronic device 101. Referring to FIG. 4, the electronic device 401 may include at least one Application Processor (AP) 410, a communication module 420, a Subscriber Identification Module (SIM) card 424, a memory 430, a sensor module 440, an input module 450, a display module 460, an interface 470, an audio module 480, a camera module 491, a power management module 495, a battery 496, an indicator 497, a motor 498, and/or the like.

The AP 410 may control one or more hardware or software components that are connected to AP 410, may perform processing and/or computation of data, including multimedia data, and/or the like. As an example, the AP 410 may be implemented as a System-on-Chip (SoC). The AP 410 may include a Graphics Processing Unit (GPU) (not shown).

The communication module 420, e.g., the communication interface 160 may transmit and receive data in communications between the electronic device 101 and other electronic devices, e.g., the electronic device 104, the server 106, and/or the like. As an example, the communication module 420 may include one or more of a cellular module 421, a Wi-Fi module 423, a Bluetooth module 425, a GPS module 427, a NFC module 428, a Radio Frequency (RF) module 429, and/or the like.

The cellular module 421 may provide services, such as a voice call, a video call, a Short Messaging Service (SMS), internet service, and/or the like, via a communication network, e.g., LTE, LTE-A, CDMA, WCDMA, UMTS, WiBro, GSM, and/or the like. As an example, the cellular module 421 may differentiate and authorize electronic devices within a communication network using a Subscriber Identification Module (SIM) card, e.g., the SIM card 424. According to various embodiments of the present disclosure, the cellular module 421 may perform at least a part of the functionalities of the AP 410. For example, the cellular module 421 may perform at least a part of multimedia control functionality.

According to various embodiments of the present disclosure, the communication interface 420 and/or the cellular module 421 may include a Communication Processor (CP). As an example, the cellular module 421 may be implemented as SoC.

Although FIG. 4 illustrates components, such as the cellular module 421, e.g., the CP, the memory 430, the power management module 495 as components that are separate from the AP 410, according to various embodiments of the present disclosure, the AP 410 may include, or be integrated with, one or more of the foregoing components, e.g., the cellular module 421.

According to various embodiments of the present disclosure, the AP 410, the cellular module 421, e.g., the CP, and/or the like, may process instructions and/or data received from at least one of non-volatile memory and other components by loading the instructions and/or data into volatile memory. The AP 410, the cellular module 421, the communication interface 420, and/or the like, may store at least one of data that is received from at least one of other components and data that is generated by at least one of the other components in the non-volatile memory.

Each of the Wi-Fi module 423, the Bluetooth module 425, the GPS module 427, the NFC module 428, and/or the like may, for example, include at least one processor that may process data received or transmitted by the respective modules. Although FIG. 4 illustrates the cellular module 421, the Wi-Fi module 423, the Bluetooth module 425, the GPS module 427, and the NFC module 428 as separate blocks, according to various embodiments of the present disclosure, any combination, e.g., two or more, of the cellular module 421, the Wi-Fi module 423, the Bluetooth module 425, the GPS module 427, the NFC module 428, and/or the like may be included in an Integrated Chip (IC) or an IC package. For example, at least some of the processors corresponding to the respective the cellular module 421, the Wi-Fi module 423, the Bluetooth module 425, the GPS module 427, the NFC module 428, and/or the like, may be implemented as a single SoC. For example, a CP corresponding to the cellular module 421 and a Wi-Fi processor corresponding to Wi-Fi module 423 may be implemented as a single SoC.

The RF module 429 may, for example, transmit and receive RF signals. Although not shown, the RF module 429 may include a transceiver, a Power Amp Module (PAM), a frequency filter, a Low Noise Amplifier (LNA), and/or the like. The RF module 429 may include one or more components for transmitting and receiving Electro-Magnetic (EM) waves, e.g., in free space or the like, such as conductors and/or conductive wires. Although FIG. 4 illustrates that the cellular module 421, the Wi-Fi module 423, the Bluetooth module 425, the GPS module 427, and the NFC module 428 are sharing one RF module 429, according to various embodiments of the present disclosure, at least one of the cellular module 421, the Wi-Fi module 423, the Bluetooth module 425, the GPS module 427, the NFC module 428, and/or the like may transmit and receive RF signals via a separate RF module.

The SIM card 424 may be a card implementing a SIM, and may be configured to be inserted into a slot disposed at a specified location of the electronic device. The SIM card 424 may include a unique identifier, e.g., an Integrated Circuit Card IDentifier (ICCID), subscriber information, e.g., an International Mobile Subscriber Identity (IMSI), and/or the like.

The memory 430, e.g., the memory 130, may include an internal memory 432, an external memory 434, or a combination thereof.

According to various embodiments of the present disclosure, the internal memory 432 may be, for example, at least one of volatile memory, e.g., Dynamic Random Access Memory (DRAM), Static Random Access Memory (SRAM) and/or Synchronous Dynamic Random Access Memory (SDRAM), non-volatile memory, e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory, and/or the like.

According to various embodiments of the present disclosure, the internal memory 432 may be a Solid State Drive (SSD). As an example, the external memory 434 may be a flash drive, e.g., a Compact Flash (CF) drive, Secure Digital (SD), micro Secure Digital (micro-SD), mini Secure Digital (mini-SD), extreme Digital (xD), Memory Stick, and/or the like. The external memory 434 may be operatively coupled to the electronic device 401 via various interfaces. According to various embodiments of the present disclosure, the electronic device 401 may include recording devices and/or recording media, such as Hard Disk Drives (HDD), and/or the like.

The sensor module 440 may measure physical/environmental properties detect operational states associated with electronic device 401, and/or the like, and convert the measured and/or detected information into signals, such as electric signals or electromagnetic signals. As an example, the sensor module 440 may include at least one of a gesture sensor 440A, a gyro sensor 440B, an atmospheric pressure sensor 440C, a magnetic sensor 440D, an accelerometer 440E, a grip sensor 440F, a proximity sensor 440G, an RGB sensor 440H, a biometric sensor 440I, a temperature/humidity sensor 440J, a luminosity sensor 440K, an Ultra Violet (UV) sensor 440M, and/or the like. The sensor module 440 may detect the operation state of the electronic device and/or measure physical properties, and convert the detected or measured information into electrical signals. Additionally or alternatively, the sensor module 440 may also include, for example, an electrical-nose sensor (not shown), an electromyography (EMG) sensor (not shown), an electroencephalogram (EEG) sensor (not shown), an infrared (IR) sensor (not shown), an eye-scanning sensor, e.g., an iris sensor, (not shown), a fingerprint sensor, and/or the like. The sensor module 440 may also include control circuitry for controlling at least one sensor included therein.

The input module 450 may include a touch panel 452, a pen sensor 454, a key 456, an ultrasonic input device 458, and/or the like.

As an example, the touch panel 452 may detect touch input using capacitive, resistive, infrared, ultrasonic methods, and/or the like. The touch panel 452 may also include a touch panel controller (not shown). As an example, a capacitive-type touch panel may detect proximity inputs, e.g. a hovering input, in addition to, or as an alternative to, physical touch inputs. The touch panel 452 may also include a tactile layer. According to various embodiments of the present disclosure, the touch panel 452 may provide haptic feedback to the user using the tactile layer.

As an example, the pen sensor 454 may be implemented using methods identical to or similar to receiving a touch input from a user, or using a separate detection sheet, e.g., a digitizer. As an example, the key 456 may be a keypad, a touch key, and/or the like. As an example, the ultrasonic input device 458 may be a device configured to identify data by detecting, using a microphone, e.g., a microphone 488, ultrasonic signals generated by a device capable of generating the ultrasonic signal. The ultrasonic input device 458 may detect data wirelessly.

According to various embodiments of the present disclosure, the electronic device 401 may receive user input from an external device, e.g., a network, computer or server, connected to the electronic device 401, using the communication module 420.

The display module 460, e.g., the display 150, may include a panel 462, a hologram device 464, a projector 466, and/or the like. As an example, the panel 462 may be, for example, a Liquid-Crystal Display (LCD), an Active-Matrix Organic Light-Emitting Diode (AM-OLED) display, and/or the like. As an example, the panel 462 may be configured to be flexible, transparent, and/or wearable. The panel 462 and the touch panel 452 may be implemented as a single module. The hologram device 464 may provide a three-dimensional image. For example, the hologram device 464 may utilize the interference of light waves to provide a three-dimensional image in empty space. The projector 466 may provide image by projecting light on a surface, e.g., a wall, a screen, and/or the like. As an example, the surface may be positioned internal or external to the electronic device 401. According to various embodiments of the present disclosure, the display module 460 may also include a control circuitry for controlling the panel 462, the hologram device 464, the projector 466, and/or the like.

The interface 470 may include, for example, one or more interfaces for a High-Definition Multimedia Interface (HDMI) 472, a Universal Serial Bus (USB) 474, a projector 476, or a D-subminiature (D-sub) 478, and/or the like. As an example, the interface 470 may be part of the communication interface 420. Additionally or alternatively, the interface 470 may include, for example, at least one interface for Mobile High-definition Link (MHL), Secure Digital (SD)/MultiMedia Card (MMC), Infrared Data Association (IrDA), and/or the like.

The audio module 480 may encode/decode sound into electrical signal, and vice versa. According to various embodiments of the present disclosure, at least a portion of audio module 480 may be part of the I/O interface 140. As an example, the audio module 480 may encode/decode voice information that is input into, or output from, a speaker 482, a receiver 484, an earphone 486, the microphone 488, and/or the like.

The camera module 491 may capture still images and/or video. According to various embodiments of the present disclosure, the camera module 491 may include at least one image sensor, e.g., a front sensor module, a rear sensor module, and/or the like (not shown), an Image Signal Processor (ISP) (not shown), and a flash, e.g., a Light-Emitting Diode (LED), a xenon lamp, and/or the like (not shown).

The power management module 495 may manage electrical power of the electronic device 401. Although not shown, the power management module 495 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 401 may include wired or wireless charging. The charger IC may charge a battery, may prevent excessive voltage or excessive current from a charger from entering the electronic device 401, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits, such as a coil loop, a resonance circuit, a rectifier, and/or the like. As an example, the battery gauge may measure a charge level, a voltage while charging, a temperature of the battery 496, and/or the like. As an example, the battery 496 may supply power to the electronic device 401. As an example, the battery 496 may be a rechargeable battery, a solar battery, and/or the like.

The indicator 497 may indicate at least one state, e.g., a boot status, a message status, a charge status, and/or the like, of the electronic device 401 or a portion thereof (e.g., AP 410). The motor 498 may convert an electrical signal into a mechanical vibration.

Although not shown, the electronic device 401 may include at least one device for supporting mobile television (mobile TV), e.g., a Graphics Processing Unit (GPU), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile and/or non-volatile storage, such as a storage device like a Read Only Memory (ROM), whether erasable or rewritable or not, or in the form of memory, such as Random Access Memory (RAM), memory chips, device or integrated circuits or on an optically or magnetically readable medium, such as a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of generating an application container, the method comprising:
   receiving, by a processor of an electronic device, a selection of a target application from among a plurality of applications included in a memory of the electronic device;
   acquiring, by the processor, a policy file corresponding to the target application indicating that data file objects of the target application are to be labeled according to a category of the target application;
   determining, by the processor, whether the policy file includes the category of the target application;
   generating, by the processor, an application container in which to run the target application in isolation from other applications not sharing the category of the target application and assigning the category of the target application to a security context; and
   running the target application in the application container,
   wherein the application container is generated corresponding to the category included in the policy file, and
   wherein the security context provides kernel level isolation and middleware isolation of the data file objects of the running target application.

2. The method of claim 1, further comprising:
   determining the category of the target application by generating category information for the target application, the category information including the category of the target application.

3. The method of claim 2, wherein the generating of the category information for the target application comprises receiving a user input indicating the category of the target application.

4. The method of claim 3, wherein the receiving of the user input indicating the category of the target application comprises at least one of receiving a user input selecting one category from among at least one predetermined category or receiving a user input corresponding to a new category.

5. The method of claim 4, further comprising assigning the target application to at least one of the one category from among the at least one predetermined category or the new category.

6. The method of claim 5, further comprising:
   updating the policy file corresponding to the target application to include the category of the target application and to correspond to the category information; and
   updating the data file objects corresponding to the target application to be associated with the category of the target application.

7. The method of claim 1, wherein other applications included in the category of the target application do not share any one of resources, information, application data and code execution with applications not included in the category of the target application.

8. The method of claim 1, wherein the policy file includes information corresponding to the target application selected by a user.

9. The method of claim 8, wherein the information included in the policy file is at least one of an application name, a digital certificate, or a related category, corresponding to the selected target application.

10. The method of claim 8, wherein the policy file may be at least one of revised or changed based on at least one of a changing environment of the electronic device or according to needs of a user of the electronic device.

11. An electronic device for generating an application container, the electronic device comprising:
    a display configured to display at least one application included in the electronic device;
    a memory configured to store at least one application included in the electronic device; and
    a processor configured to:
      receive a selection of a target application from among the at least one application included in the memory of the electronic device,
      acquire a policy file corresponding to the target application indicating that data file objects of the target application are to be labeled according to a category of the target application,
      determine whether the policy file includes the category of the target application,
      generate an application container in which to run the target application in isolation from other applications not sharing the category of the target application and assign the category of the target application to a security context, and
      run the target application in the application container,
    wherein the application container is generated corresponding to the category included in the policy file, and
    wherein the security context provides kernel level isolation and middleware isolation of the data file objects of the running target application.

12. The electronic device of claim 11, wherein the processor is further configured to generate category information for the target application, the category information including the category of the target application.

13. The electronic device of claim 12,
    wherein the processor is further configured to receive a user input indicating the category of the target application, and
    wherein the display is further configured to receive a touch input corresponding to the user input.

14. The electronic device of claim 13, wherein the processor is further configured to receive at least one of a user input selecting one category from among at least one predetermined category or a user input corresponding to a new category.

15. The electronic device of claim 14, wherein the processor is further configured to assign the target application to at least one of the one category from among the at least one predetermined category or the new category.

16. The electronic device of claim 15, wherein the processor is further configured to:
    update the policy file corresponding to the target application to include the category of the target application and to correspond to the category information, and update the data file objects corresponding to the target application to be associated with the category of the target application.

17. The electronic device of claim 11, wherein the processor is further configured to not share any one of resources, information, application data and code execution with applications not included in the category of the target application.

18. The electronic device of claim 11, wherein the policy file includes information corresponding to the target application selected by a user.

19. The electronic device of claim 18, wherein the information included in the policy file is at least one of an application name, a digital certificate, or a related category, corresponding to the selected target application.

20. The electronic device of claim 18, wherein the policy file may be at least one of revised or changed based on at least one of a changing environment of the electronic device or according to needs of a user of the electronic device.

* * * * *